United States Patent
Tang et al.

(10) Patent No.: US 10,547,668 B2
(45) Date of Patent: Jan. 28, 2020

(54) COMMUNICATIONS SYSTEM AND COMMUNICATION METHOD

(71) Applicant: Huawei Technologies Co., Ltd., Shenzhen, Guangdong (CN)

(72) Inventors: Jiyuan Tang, Shenzhen (CN); Bin Huang, Hangzhou (CN); Wei Wang, Hangzhou (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 434 days.

(21) Appl. No.: 15/417,964

(22) Filed: Jan. 27, 2017

(65) Prior Publication Data

US 2017/0142193 A1    May 18, 2017

Related U.S. Application Data

(63) Continuation of application No. PCT/CN2014/083378, filed on Jul. 31, 2014.

(51) Int. Cl.
*H04L 29/08* (2006.01)
*H04L 12/24* (2006.01)

(52) U.S. Cl.
CPC .............. *H04L 67/10* (2013.01); *H04L 41/12* (2013.01)

(58) Field of Classification Search
CPC ....................................................... H04L 67/10
See application file for complete search history.

(56) References Cited

U.S. PATENT DOCUMENTS 8,103,809 B1   1/2012   Michels et al.
9,507,617 B1 *   11/2016   Wang .................... G06F 9/4555
(Continued)

FOREIGN PATENT DOCUMENTS

CN   101477511 A   7/2009
CN   101667144 A   3/2010
(Continued)

OTHER PUBLICATIONS

Nikolaev et al.; "VirtuOS: An Operating System with Kernel Virtualization"; SOSP' 13, Nov. 3-6, 2013, Farmington, Pennsylvania, USA; 17 pages.
(Continued)

*Primary Examiner* — Suraj M Joshi
(74) *Attorney, Agent, or Firm* — Womble Bond Dickinson (US) LLP

(57) ABSTRACT

A communications system and a communication method are disclosed. The communication method includes: sending, by a first computing node, a communication manner parsing request to a management node, where the communication manner parsing request includes an identifier of the first computing node and an identifier of a second computing node; determining, by the management node, information about a physical communication manner between the first computing node and the second computing node according to the communication manner parsing request and communication manner reference information, where the communication manner reference information includes system topology information and a system physical resource allocation result; sending, by the management node, the information about the physical communication manner to the first computing node; and communicating, by the first computing node, with the second computing node based on the information about the physical communication manner. Embodiments of the present disclosure can improve communication efficiency.

20 Claims, 4 Drawing Sheets

(56) References Cited

U.S. PATENT DOCUMENTS

| | | | |
|---|---|---|---|
| 2003/0069938 A1 | 4/2003 | Russell | |
| 2009/0144510 A1* | 6/2009 | Wibling | G06F 9/5016 |
| | | | 711/147 |
| 2010/0217916 A1* | 8/2010 | Gao | G06F 12/109 |
| | | | 711/6 |

FOREIGN PATENT DOCUMENTS

| | | |
|---|---|---|
| CN | 102047245 A | 5/2011 |
| CN | 102110071 A | 6/2011 |
| CN | 102752802 A | 10/2012 |
| WO | 2010114715 A1 | 10/2010 |

OTHER PUBLICATIONS

Stevens, W.R.; "TCP/IP Illustrated, ARP: Address Resolution Protocol"; TCP/IP Illustrated vol. 1: The Protocols (Professional Computing Series); Addison-Wesley, US, pp. 53-68. 111.

Tatte, Vaibhao Vikas; "Shared Memory Based Communication Between Collocated Virtual Machines MTP—Stage 1 Report", Jan. 1, 2010; Department of Computer Science and Engineering, India Institute of Technology; Bombay, Mumbai; 24 pages.

Lumsdaine et al.; "Open MPI Tutorial"; Nov. 19, 2009; https://www.open-mpi.org/papers/sc-2009/jjhursey-iu-booth.pdf; Retrieved Mar. 29, 2017; 140 pages.

* cited by examiner

COMMUNICATIONS SYSTEM AND COMMUNICATION METHOD

CROSS-REFERENCE TO RELATED APPLICATIONS

This application is a continuation of International Application No. PCT/CN2014/083378, filed on Jul. 31, 2014, the disclosure of which is hereby incorporated by reference in its entirety.

TECHNICAL FIELD

Embodiments of the present disclosure relate to the computer field, and more specifically, to a communications system and a communication method.

BACKGROUND

With an increasingly high requirement imposed by people on server performance, improving computing performance by increasing a clock speed becomes a thing of the past. A decoupling hardware architecture and a distributed computer architecture become a development direction of a server architecture.

In the decoupling hardware architecture, each component of a server is decoupled and complex component design is changed to simple and effective design. All the components that are decoupled are interconnected using a high-speed interconnection channel. In the distributed computer architecture, the server includes multiple processors, and all the processors are interconnected using the Internet. In this way, a task of a central processing unit is allocated to the multiple processors for processing, so as to implement coordination between all the processors of different functions and sharing of a peripheral and software of a server system.

Currently, in a full virtualization mode, communication is performed, based on an Ethernet communications protocol, between multiple operating systems that work in the foregoing server system (that is, a communications system). For example, communication is performed based on a Transmission Control Protocol/an Internet Protocol (Transmission Control Protocol/Internet Protocol, TCP/IP). However, there is room for further improvement of efficiency of communication between multiple operating systems whose hardware is interconnected.

SUMMARY

Embodiments of the present disclosure provide a communications system and a communication method, so as to improve communication efficiency.

According to a first aspect, an embodiment of the present disclosure provides a communication method, applied to a communications system that has multiple operating systems OSs, where the communications system includes a management node, a first computing node, and a second computing node, one OS runs on each of the first computing node and the second computing node, and the communication method includes: sending, by the first computing node, a communication manner parsing request to the management node, where the communication manner parsing request includes an identifier of the first computing node and an identifier of the second computing node; determining, by the management node, information about a physical communication manner between the first computing node and the second computing node according to the communication manner parsing request and communication manner reference information, where the communication manner reference information includes system topology information and a system physical resource allocation result; sending, by the management node, the information about the physical communication manner to the first computing node; and communicating, by the first computing node, with the second computing node based on the information about the physical communication manner.

With reference to the first aspect, in a first implementation manner of the first aspect, before the sending, by the first computing node, a communication manner parsing request to the management node, the communication method further includes: determining, by the first computing node, whether specified historical information includes the information about the physical communication manner between the first computing node and the second computing node; and the sending, by the first computing node, a communication manner parsing request to the management node includes: sending, by the first computing node, the communication manner parsing request to the management node when determining that the historical information does not include the information about the physical communication manner.

With reference to the first aspect and the foregoing implementation manner of the first aspect, in a second implementation manner of the first aspect, after the sending, by the management node, the information about the physical communication manner to the first computing node, the communication method further includes: recording, by the first computing node, the information about the physical communication manner into the historical information.

With reference to the first aspect and the foregoing implementation manners of the first aspect, in a third implementation manner of the first aspect, the information about the physical communication manner includes one of: information about a local memory sharing communication manner, information about an external memory sharing communication manner, or information about a high-speed interconnection communication manner.

With reference to the first aspect and the foregoing implementation manners of the first aspect, in a fourth implementation manner of the first aspect, the communication manner reference information further includes a system physical resource usage status.

With reference to the first aspect and the foregoing implementation manners of the first aspect, in a fifth implementation manner of the first aspect, the communication manner parsing request further includes a data packet type and a data packet size.

With reference to the first aspect and the foregoing implementation manners of the first aspect, in a sixth implementation manner of the first aspect, the system topology information includes one or more of: architecture information of a central processing unit CPU, local memory information, externally shared memory information, decoupling architecture high-speed interconnection information, or network interconnection information.

According to a second aspect, an embodiment of the present disclosure provides a communications system, where the communications system includes a management node, a first computing node, and a second computing node, and one OS runs on each of the first computing node and the second computing node, where the first computing node is configured to send a communication manner parsing request to the management node, where the communication manner parsing request includes an identifier of the first computing node and an identifier of the second computing node; the management node is configured to determine information about a physical communication manner between the first computing node and the second computing node according to the communication manner parsing request and communication manner reference information, where the communication manner reference information includes system topology information and a system physical resource allocation result; the management node is further configured to send the information about the physical communication manner to the first computing node; and the first computing node is further configured to communicate with the second computing node based on the information about the physical communication manner.

With reference to the second aspect, in a first implementation manner of the second aspect, the first computing node is further configured to determine whether specified historical information includes the information about the physical communication manner between the first computing node and the second computing node; and the first computing node is specifically configured to send the communication manner parsing request to the management node when determining that the historical information does not include the information about the physical communication manner.

With reference to the second aspect and the foregoing implementation manner of the second aspect, in a second implementation manner of the second aspect, the first computing node is further configured to record the information about the physical communication manner into the historical information.

With reference to the second aspect and the foregoing implementation manners of the second aspect, in a third implementation manner of the second aspect, the information about the physical communication manner includes one of: information about a local memory sharing communication manner, information about an external memory sharing communication manner, or information about a high-speed interconnection communication manner.

With reference to the second aspect and the foregoing implementation manners of the second aspect, in a fourth implementation manner of the second aspect, the communication manner reference information further includes a system physical resource usage status.

With reference to the second aspect and the foregoing implementation manners of the second aspect, in a fifth implementation manner of the second aspect, the communication manner parsing request further includes a data packet type and a data packet size.

With reference to the second aspect and the foregoing implementation manners of the second aspect, in a sixth implementation manner of the second aspect, the system topology information includes one or more of: architecture information of a central processing unit CPU, local memory information, externally shared memory information, decoupling architecture high-speed interconnection information, or network interconnection information.

Based on the foregoing technical solutions, in the embodiments of the present disclosure, a management node determines information about a physical communication manner between two computing nodes according to topology information of a communications system. In this way, if a hardware connection exists between the computing nodes, communication may be performed between the computing nodes according to the foregoing information about the physical communication manner, so that communication efficiency is improved.

BRIEF DESCRIPTION OF THE DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some but not all of the embodiments of the present disclosure.

Figure 1:
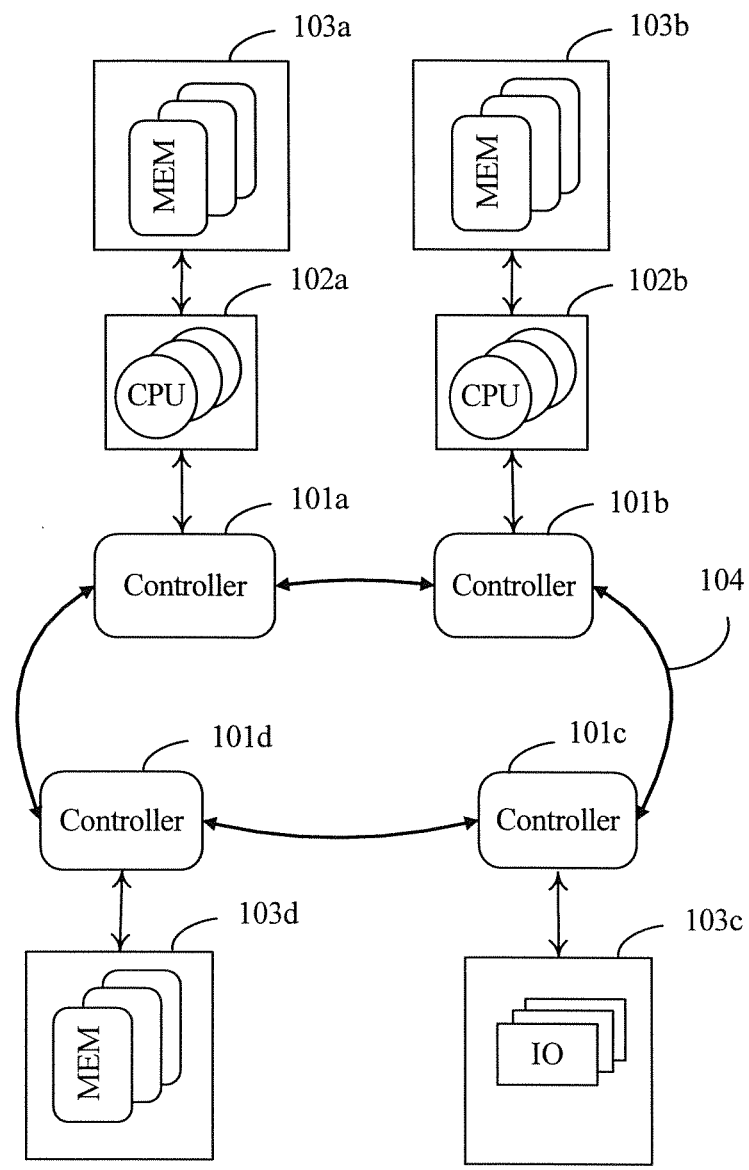
FIG. 1 is a schematic diagram of a hardware architecture of an applicable communications system according to an embodiment of the present disclosure.

FIG. 1 is a schematic diagram of a hardware architecture of an applicable communications system according to an embodiment of the present disclosure.

The communications system shown in FIG. 1 includes controllers (101a, 101b, 101c, and 101d), processors (102a and 102b), memories (103a, 103b, and 103d), and an interface repository 103c. The controllers (101a, 101b, 101c, and 101d) are connected using a high-speed interconnection channel. The interface repository 103c provides a communications interface for communication between components of a server. The processor (102a or 102b) may include one or more central processing unit (CPU) nodes.

Each CPU node may have multiple logical CPUs. Each CPU node may be a uniform memory access (UMA) architecture, or may be a non-uniform memory access (NUMA) architecture. In general, the multiple logical CPUs on each CPU node share local memory. Although different CPU nodes do not share local memory, the different CPU nodes are connected using a high-speed interconnection channel and share an external memory pool and a network interface repository. That is, in addition to a traditional Ethernet manner, the different CPU nodes may further communicate with each other in a manner of sharing external memory and the high-speed interconnection channel.

For example, the memory 103a is connected to the processor 102a. For a CPU board in the processor 102a, the memory 103a is a local memory. Correspondingly, for the CPU board in the processor 102a, the memory (103b or 103d) that is not connected to the processor 102a is an external memory.

Similarly, the memory 103b is connected to the processor 102b. For a CPU board in the processor 102b, the memory 103b is a local memory. Correspondingly, for the CPU board in the processor 102b, the memory (103a or 103d) that is not connected to the processor 102b is an external memory.

It should be understood that the diagram of the hardware architecture of the server shown in FIG. 1 is only an example of a diagram of a hardware architecture of an applicable computer system in the embodiments of the present disclosure, and the protection scope of the embodiments of the present disclosure is not limited thereto.

Figure 2:
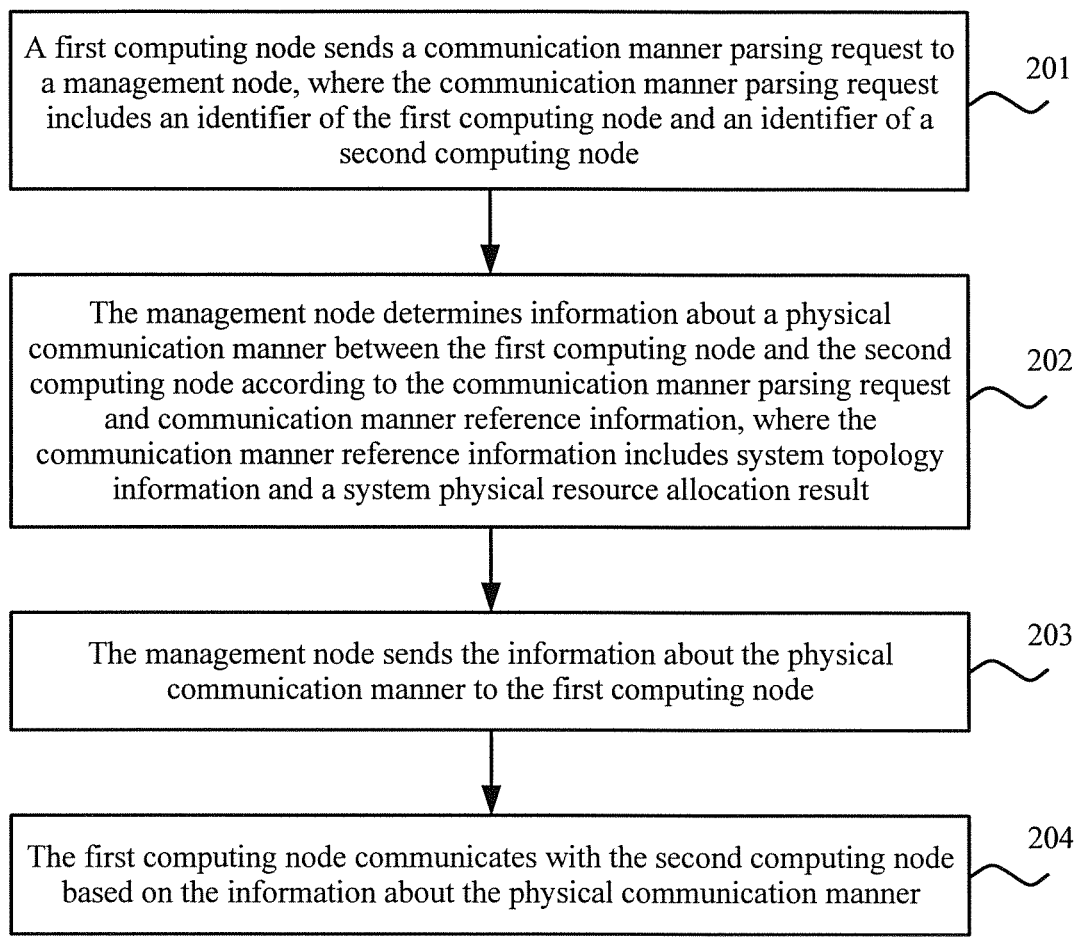
FIG. 2 is a schematic flowchart of a communication method according to an embodiment of the present disclosure.

FIG. 2 is a schematic flowchart of a communication method according to an embodiment of the present disclosure. The communication method may be applied to a communications system that has multiple operating systems (OS). For example, the communications system may have the hardware architecture shown in FIG. 1. The communications system includes a management node, a first computing node, and a second computing node, where one OS runs on each of the first computing node and the second computing node. Physical resources that are in the communications system shown in FIG. 1 and that are specifically occupied by the management node, the first computing node, and the second computing node are not limited. For example, a CPU node shown in FIG. 1 may include one or more logical CPUs. Each of the first computing node, the second computing node, and the management node may include at least one logical CPU. Further, the management node, the first computing node, and the second computing node may be of logical division, or may be of physical entity division.

201. The first computing node sends a communication manner parsing request to the management node, where the communication manner parsing request includes an identifier of the first computing node and an identifier of the second computing node.

202. The management node determines information about a physical communication manner between the first computing node and the second computing node according to the communication manner parsing request and communication manner reference information, where the communication manner reference information includes system topology information and a system physical resource allocation result.

For example, when the first computing node or the second computing node applies to the management node for a physical resource, the management node allocates a corresponding physical resource to the computing node according to a need of the computing node for use by the computing node, and records information about physical resources used by the computing nodes (that is, the physical resource allocation result). In this case, the management node may determine an available physical communication manner between the computing nodes according to the recorded information about the physical resources used by the computing nodes and the system topology information of the communications system.

Specifically, when a computing node starts, the computing node may apply to the management node for a physical resource by means of information exchange with the management node. Herein, the first computing node is used as an example for description. When the first computing node starts, the management node may allocate an identifier to the first computing node, and return the identifier to the first computing node. At the same time, the management node allocates a physical resource to the first computing node according to a need of the first computing node, and records a correspondence between the identifier of the first computing node and the physical resource.

Similarly, the second computing node may also apply to the management node for a physical resource according to the foregoing method when starting. In addition, when the communications system includes another computing node, the another computing node may also apply to the management node for a physical resource according to the foregoing method when starting. To avoid repetition, details are not described herein.

In addition, when the physical resource allocated to the first computing node or the second computing node changes, the management node updates the physical resource allocation result. For example, when the first computing node additionally applies to the management node for a physical resource, or the management node releases some physical resources to be used by the first computing node, the management node needs to update the physical resource allocation result.

Similarly, when the second computing node additionally applies to the management node for a physical resource, or the management node releases some physical resources to be used by the second computing node, the management node needs to update the physical resource allocation result.

In this case, when the management node determines the information about the physical communication manner between the first computing node and the second computing node according to the physical resource allocation result and the system topology information of the communications system, the management node may determine the information about the physical communication manner between the first computing node and the second computing node according to the identifier of the first computing node and the identifier of the second computing node that are in the communication manner parsing request, the correspondence between the identifier of the first computing node and the physical resource and a correspondence between the identifier of the second computing node and the physical resource, and the system topology information of the communications system, where the correspondence between the identifier of the first computing node and the physical resource and the correspondence between the identifier of the second computing node and the physical resource are in the physical resource allocation result.

For example, the management node may determine a physical resource to be used by the first computing node and a physical resource to be used by the second computing node according to stored correspondences between identifiers of computing nodes and physical resources. In this way, the management node may determine the information about the physical communication manner between the first computing node and the second computing node with reference to the system topology information of the communications system. The system topology information of the communications system includes a hardware connection relationship between the physical resource used by the first computing node and the physical resource used by the second computing node.

203. The management node sends the information about the physical communication manner to the first computing node.

204. The first computing node communicates with the second computing node based on the information about the physical communication manner.

For example, the management node may send the information about the physical communication manner to the first computing node, and the first computing node initiates a communication connection to the second computing node. Alternatively, after obtaining the information about the physical communication manner, the first computing node requests assistance from the management node to complete a communication connection.

For another example, the management node may send the information about the physical communication manner to both the first computing node and the second computing node. In this way, the first computing node and the second computing node complete a communication connection in a manner indicated in the information about the physical communication manner.

Based on the foregoing technical solutions, in this embodiment of the present disclosure, a management node determines information about a physical communication manner between two computing nodes according to topology information of a communications system. In this way, if a hardware connection exists between the computing nodes, communication may be performed between the computing nodes according to the foregoing information about the physical communication manner, so that communication efficiency is improved.

Further, when the physical communication manner between the computing nodes is unavailable, or no hardware connection exists between the computing nodes, communication may be performed between the computing nodes based on an Ethernet communications protocol. Compared with an Ethernet communication manner, the physical communication manner has higher transmission efficiency and flexibility. Specifically, a physical resource may be flexibly allocated according to an attribute of a data packet transmitted between the computing nodes, so as to reach different transmission speeds.

It should be understood that the information about the physical communication manner may include all information required for establishing a physical communication connection between the first computing node and the second computing node, for example, an identifier of the communication manner and an identifier of a physical resource that is occupied by this physical communication connection. Alternatively, the information about the physical communication manner may include only an identifier of the physical communication manner. In this case, when establishing the physical communication connection to the second computing node, the first computing node may apply to the management node for the physical resource used during this communication. These variations of this embodiment shall fall within the protection scope of the embodiments of the present disclosure.

It should be also understood that, the first computing node, the second computing node, and the management node may be located in a same processor or in different processors of the processors (102a and 102b) shown in FIG. 1, which is not limited in this embodiment of the present disclosure.

Optionally, in another embodiment, before the first computing node sends the communication manner parsing request to the management node, the first computing node determines whether specified historical information includes the information about the physical communication manner between the first computing node and the second computing node. In this case, when sending the communication manner parsing request to the management node, the first computing node may send the communication manner parsing request to the management node when determining that the historical information does not include the information about the physical communication manner.

For example, when the historical information includes the information about the physical communication manner, the first computing node determines the information about the physical communication manner from the historical information. When the historical information does not include the information about the physical communication manner, the first computing node sends the communication manner parsing request to the management node, and then receives the information about the physical communication manner from the management node. In this way, the first computing node does not need to request the management node to obtain, by means of parsing, the information about the physical communication manner each time communication is performed, so that system overheads are reduced.

In addition, when supporting asynchronous processing, the first computing node may make other preparations for the communication connection at the same time when sending the communication manner parsing request to the management node.

Optionally, in an embodiment, after the management node sends the information about the physical communication manner to the first computing node, the first computing node records the information about the physical communication manner into the historical information.

In this way, during next-time communication, the first computing node may directly obtain the information about the physical communication manner from the historical information and does not need to request the management node to obtain, by means of parsing, the information about the physical communication manner, thereby reducing system overheads.

In addition, when the management node updates the physical resource allocation result, the first computing node may clear the historical information, or set the historical information to be invalid. In this way, the first computing node may communicate according to latest information about the physical communication manner, which can improve communication efficiency to the full extent.

Optionally, in another embodiment, the information about the physical communication manner includes one of: information about a local memory sharing communication manner, information about an external memory sharing communication manner, or information about a high-speed interconnection communication manner.

For example, the information about the local memory sharing communication manner may include an identifier of the local memory sharing communication manner and a start-stop address of local memory allocated for this communication. The information about the external memory sharing communication manner may include an identifier of the external memory sharing communication manner and a start-stop address of external memory allocated for this communication. The information about the high-speed interconnection communication manner may include an identifier of the high-speed interconnection communication manner and an address of a high-speed interconnection channel used during this communication.

It should be understood that, the local memory sharing communication manner means that two virtual machines communicate using shared local memory. The external memory sharing communication manner means that two virtual machines communicate using shared external memory. The high-speed interconnection communication manner means that two virtual machines communicate using a high-speed interconnection channel.

Optionally, in another embodiment, the communication manner reference information further includes a system physical resource usage status.

For example, the management node determines all physical communication manners between the first computing node and the second computing node according to the physical resource allocation result and the system topology information. Then, the management node analyzes all the foregoing physical communication manners with reference to the physical resource usage status, and determines information about a final physical communication manner.

Specifically, it is assumed that a priority of the local memory sharing communication manner is the highest. The management node may determine whether remaining space of local memory is greater than a preset threshold. When the remaining space of the memory is greater than the preset threshold, the management node may determine the identifier of the local memory sharing communication manner and information about a communication address allocated for this communication as the information about the physical communication manner.

Conversely, when the remaining space of the memory is less than the preset threshold, the management node may determine, according to the physical resource usage status, whether a communication manner with the second-highest priority is available. The determining method is similar to the method described in the foregoing. To avoid repetition, details are not described herein.

Optionally, in another embodiment, the communication manner parsing request further includes a data packet type and a data packet size.

In this case, the management node may determine the information about the physical communication manner for the first computing node with reference to the data packet type and the data packet size that are in the communication manner parsing request. For example, when the data packet is relatively small, the high-speed interconnection communication manner may be selected. When the data packet is relatively large, the local memory sharing communication manner is the fastest. In addition, with reference to the data packet type, that is, an immediacy requirement of the data packet, the management node may select a more appropriate communication manner for the first computing node.

Optionally, in another embodiment, the system topology information includes one or more of: architecture information of a central processing unit CPU, local memory information, externally shared memory information, decoupling architecture high-speed interconnection information, or network interconnection information.

The following provides a detailed description of this embodiment of the present disclosure with reference to specific examples. It should be noted that these examples are merely intended to help persons skilled in the art better understand this embodiment of the present disclosure, but are not intended to limit the scope of this embodiment of the present disclosure.

Figure 3:
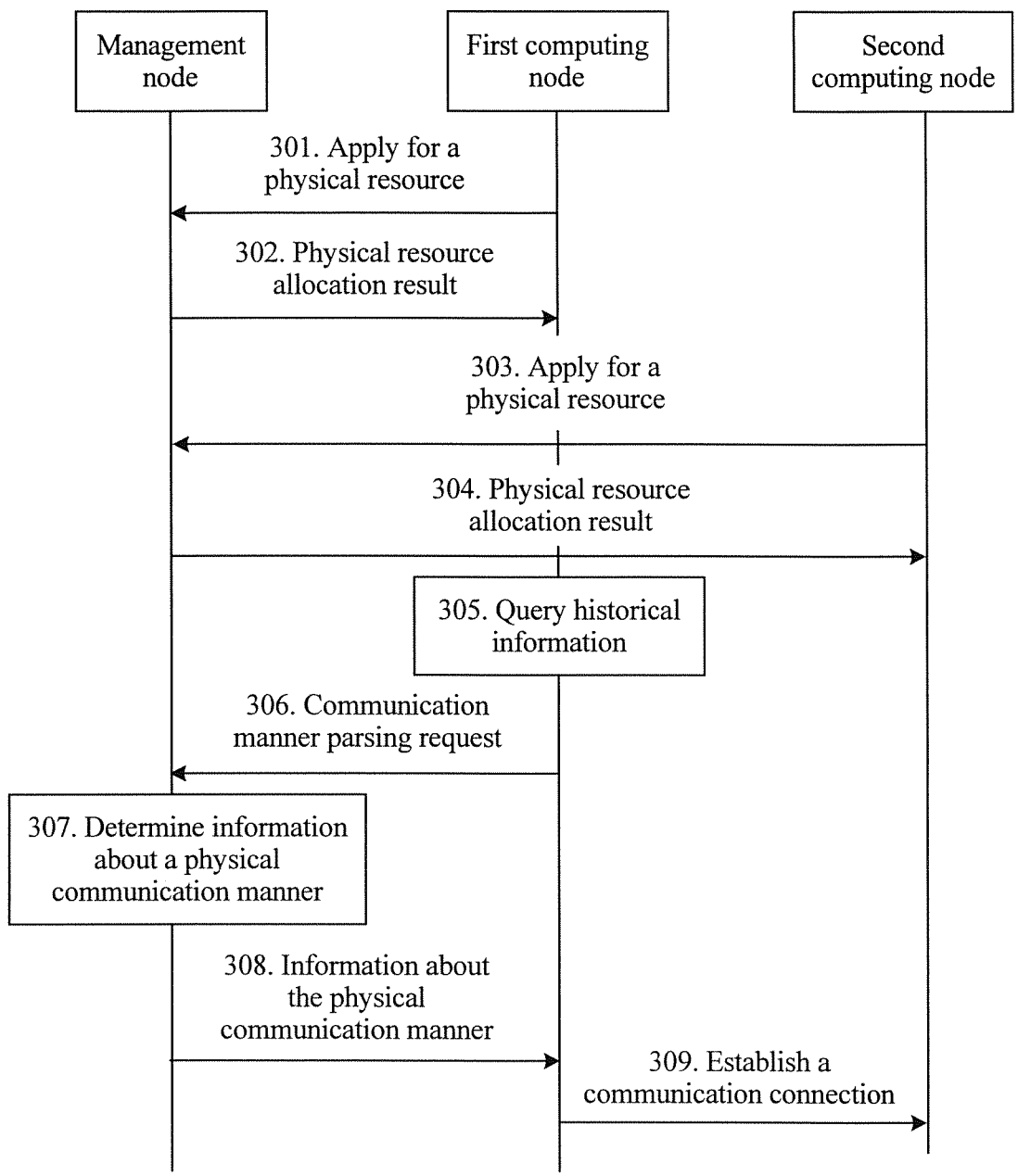
FIG. 3 is a schematic flowchart of a communication method according to another embodiment of the present disclosure.

FIG. 3 is a schematic flowchart of a communication method according to another embodiment of the present disclosure.

301. When starting, a first computing node applies to a management node for a physical resource.

302. After allocating the physical resource to the first computing node, the management node returns an allocation result to the first computing node, where the allocation result includes a correspondence between an identifier of the first computing node and the physical resource.

303. When starting, a second computing node applies to the management node for a physical resource.

304. After allocating the physical resource to the second computing node, the management node returns an allocation result to the second computing node, where the allocation result includes a correspondence between an identifier of the second computing node and the physical resource.

305. When intending to communicate with the second computing node, the first computing node first queries specified historical information; and if the historical information includes information about a physical communication manner between the first computing node and the second computing node, the first computing node may directly determine the information about the physical communication manner from the historical information, or if the historical information does not include information about a physical communication manner between the first computing node and the second computing node, step 306 is executed.

306. The first computing node sends a communication manner parsing request to the management node.

307. The management node determines the information about the physical communication manner between the first computing node and the second computing node for the first computing node according to the communication manner parsing request.

For example, the management node may determine an available physical communication manner between computing nodes according to recorded information about physical resources used by all computing nodes and system topology information of a communications system, so as to determine information about the physical communication manner.

308. The management node sends the information about the physical communication manner to the first computing node.

309. The first computing node establishes a communication connection to the second computing node according to the information about the physical communication manner to perform communication.

Based on the foregoing technical solutions, in this embodiment of the present disclosure, a management node determines information about a physical communication manner between two computing nodes according to topology information of a communications system. In this way, if a hardware connection exists between the computing nodes, communication may be performed between the computing nodes according to the foregoing information about the physical communication manner, so that communication efficiency is improved.

Figure 4:
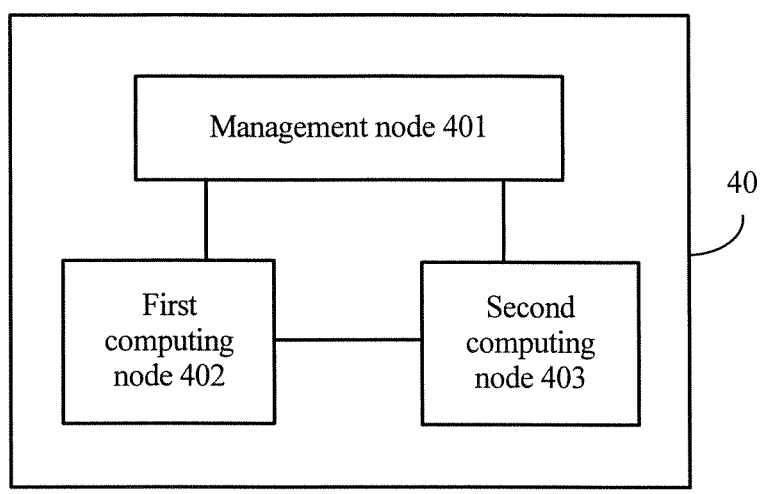
FIG. 4 is a schematic block diagram of a communications system according to an embodiment of the present disclosure.

FIG. 4 is a schematic block diagram of a communications system according to an embodiment of the present disclosure. The communications system 40 includes a management node 401, a first computing node 402, and a second computing node 403. For example, the communications system 40 may have the hardware architecture shown in FIG. 1. Physical resources occupied by the management node 401, the first computing node 402, and the second computing node 403 are not limited. For example, a CPU node shown in FIG. 1 may include one or more logical CPUs. Each of the first computing node, the second computing node, and the management node may include at least one logical CPU. One OS runs on each of the first computing node 402 and the second computing node 403. Further, the management node 401, the first computing node 402, and the second computing node 403 may be of logical division, or may be of physical entity division.

The first computing node 402 is configured to send a communication manner parsing request to the management node 401, where the communication manner parsing request includes an identifier of the first computing node 402 and an identifier of the second computing node 403.

The management node 401 is configured to determine information about a physical communication manner between the first computing node 402 and the second computing node 403 according to the communication manner parsing request and communication manner reference information, where the communication manner reference information includes system topology information and a system physical resource allocation result.

For example, when the first computing node 402 or the second computing node 403 applies to the management node 401 for a physical resource, the management node 401 allocates a corresponding physical resource to the computing node according to a need of the computing node for use by the computing node, and records information about physical resources used by the computing nodes (that is, the physical resource allocation result). In this case, the management node 401 may determine an available physical communication manner between the computing nodes according to the recorded information about the physical resources used by the computing nodes and the system topology information.

Specifically, when a computing node starts, the computing node may apply to the management node 401 for a physical resource by means of information exchange with the management node 401. Herein, the first computing node 402 is used as an example for description. When the first computing node 402 starts, the management node 401 may allocate an identifier to the first computing node 402, and return the identifier to the first computing node 402. At the same time, the management node 401 allocates a physical resource to the first computing node 402 according to a need of the first computing node 402, and records a correspondence between the identifier of the first computing node 402 and the physical resource.

Similarly, the second computing node 403 may also apply to the management node 401 for a physical resource according to the foregoing method when starting. In addition, when the communications system includes another computing node, the another computing node may also apply to the management node 401 for a physical resource according to the foregoing method when starting. To avoid repetition, details are not described herein.

In addition, when the physical resource allocated to the first computing node 402 or the second computing node 403 changes, the management node 401 updates the physical resource allocation result. For example, when the first computing node 402 additionally applies to the management node 401 for a physical resource, or the management node 401 releases some physical resources to be used by the first computing node 402, the management node 401 needs to update the physical resource allocation result.

Similarly, when the second computing node 403 additionally applies to the management node 401 for a physical resource, or the management node 401 releases some physical resources to be used by the second computing node 402, the management node 401 needs to update the physical resource allocation result.

In this case, when the management node 401 determines the information about the physical communication manner between the first computing node 402 and the second computing node 403 according to the physical resource allocation result and the system topology information of the communications system, the management node 401 may determine the information about the physical communication manner between the first computing node 401 and the second computing node 403 according to the identifier of the first computing node 402 and the identifier of the second computing node 403 that are in the communication manner parsing request, the correspondence between the identifier of the first computing node 402 and the physical resource and a correspondence between the identifier of the second computing node 403 and the physical resource, and the system topology information of the communications system, where the correspondence between the identifier of the first computing node 402 and the physical resource and the correspondence between the identifier of the second computing node 403 and the physical resource are in the physical resource allocation result.

For example, the management node 401 may determine a physical resource to be used by the first computing node 402 and a physical resource to be used by the second computing node 403 according to stored correspondences between identifiers of computing nodes and physical resources. In this way, the management node 401 may determine the information about the physical communication manner between the first computing node 402 and the second computing node 403 with reference to the system topology information of the communications system, that is, a hardware connection relationship between the physical resource used by the first computing node 402 and the physical resource used by the second computing node 403.

The management node 401 is further configured to send the information about the physical communication manner to the first computing node 402.

The first computing node 402 is further configured to communicate with the second computing node 403 based on the information about the physical communication manner.

For example, the management node 401 may send the information about the physical communication manner to the first computing node 402, and the first computing node 402 initiates a communication connection to the second computing node 403. Alternatively, after obtaining the information about the physical communication manner, the first computing node 402 requests assistance from the management node 401 to complete a communication connection.

For another example, the management node 401 may send the information about the physical communication manner to both the first computing node 402 and the second computing node 403. In this way, the first computing node 402 and the second computing node 403 complete a communication connection in a manner indicated in the information about the physical communication manner.

Based on the foregoing technical solutions, in this embodiment of the present disclosure, a management node determines information about a physical communication manner between two computing nodes according to topology information of a communications system. In this way, if a hardware connection exists between the computing nodes, communication may be performed between the computing nodes according to the foregoing information about the physical communication manner, so that communication efficiency is improved.

Further, when the physical communication manner between the computing nodes is unavailable, or no hardware connection exists between the computing nodes, communication may be performed between the computing nodes based on an Ethernet communications protocol. Compared with an Ethernet communication manner, the physical communication manner has higher transmission efficiency and flexibility. Specifically, a physical resource may be flexibly allocated according to an attribute of a data packet transmitted between the computing nodes, so as to reach different transmission speeds.

It should be understood that the information about the physical communication manner may include all information required for establishing a physical communication connection between the first computing node and the second computing node, for example, an identifier of the communication manner and an identifier of a physical resource that is occupied by this physical communication connection. Alternatively, the information about the physical communication manner may include only an identifier of the physical communication manner. In this case, when establishing the physical communication connection to the second computing node, the first computing node may apply to the management node for the physical resource used during this communication. These variations of this embodiment shall fall within the protection scope of the embodiments of the present disclosure.

It should be also understood that, the first computing node, the second computing node, and the management node may be located in a same processor or in different processors of the processors (102a and 102b) shown in FIG. 1, which is not limited in this embodiment of the present disclosure.

Optionally, in another embodiment, the first computing node 402 is further configured to determine whether specified historical information includes the information about the physical communication manner between the first computing node 402 and the second computing node 403. In this case, the first computing node 402 is specifically configured to send the communication manner parsing request to the management node 401 when determining that the historical information does not include the information about the physical communication manner.

For example, when the historical information includes the information about the physical communication manner, the first computing node 402 determines the information about the physical communication manner from the historical information. When the historical information does not include the information about the physical communication manner, the first computing node 402 sends the communication manner parsing request to the management node 401, and then receives the information about the physical communication manner from the management node 401. In this way, the first computing node 402 does not need to request the management node 401 to obtain, by means of parsing, the information about the physical communication manner each time communication is performed, so that system overheads are reduced.

In addition, when supporting asynchronous processing, the first computing node 402 may make other preparations for the communication connection at the same time when sending the communication manner parsing request to the management node 401.

Optionally, in an embodiment, the first computing node 402 is further configured to record the information about the physical communication manner into the historical information.

In this way, during next-time communication, the first computing node may directly obtain the information about the physical communication manner from the historical information and does not need to request the management node to obtain, by means of parsing, the information about the physical communication manner, thereby reducing system overheads.

In addition, when the management node updates the physical resource allocation result, the first computing node may clear the historical information, or set the historical information to be invalid. In this way, the first computing node may communicate according to latest information about the physical communication manner, which can improve communication efficiency to the full extent.

Optionally, in another embodiment, the information about the physical communication manner includes one of: information about a local memory sharing communication manner, information about an external memory sharing communication manner, or information about a high-speed interconnection communication manner.

For example, the information about the local memory sharing communication manner may include an identifier of the local memory sharing communication manner and a start-stop address of local memory allocated for this communication. The information about the external memory sharing communication manner may include an identifier of the external memory sharing communication manner and a start-stop address of external memory allocated for this communication. The information about the high-speed interconnection communication manner may include an identifier of the high-speed interconnection communication manner and an address of a high-speed interconnection channel used during this communication.

It should be understood that, the local memory sharing communication manner means that two virtual machines communicate using shared local memory. The external memory sharing communication manner means that two virtual machines communicate using shared external memory. The high-speed interconnection communication manner means that two virtual machines communicate using a high-speed interconnection channel.

Optionally, in another embodiment, the communication manner reference information further includes a system physical resource usage status.

For example, the management node 401 determines all physical communication manners between the first computing node 402 and the second computing node 403 according to the physical resource allocation result and the system topology information. Then, the management node 401 analyzes all the foregoing physical communication manners with reference to the physical resource usage status, and determines information about a final physical communication manner.

Specifically, it is assumed that a priority of the local memory sharing communication manner is the highest. The management node 401 may determine whether remaining space of local memory is greater than a preset threshold. When the remaining space of the memory is greater than the preset threshold, the management node 401 may determine the identifier of the local memory sharing communication manner and information about a communication address allocated for this communication as the information about the physical communication manner.

Conversely, when the remaining space of the memory is less than the preset threshold, the management node 401 may determine, according to the physical resource usage status, whether a communication manner with the second-highest priority is available. The determining method is similar to the method described in the foregoing. To avoid repetition, details are not described herein.

Optionally, in another embodiment, the communication manner parsing request further includes a data packet type and a data packet size.

In this case, the management node 401 may determine the information about the physical communication manner for the first computing node 402 with reference to the data packet type and the data packet size that are in the communication manner parsing request. For example, when the data packet is relatively small, the high-speed interconnection communication manner may be selected. When the data packet is relatively large, the local memory sharing communication manner is the fastest. In addition, with reference to the data packet type, that is, an immediacy requirement of the data packet, the management node 401 may select a more appropriate communication manner for the first computing node 402.

Optionally, in another embodiment, the system topology information includes one or more of: architecture information of a central processing unit CPU, local memory information, externally shared memory information, decoupling architecture high-speed interconnection information, or network interconnection information.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

Persons of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure.

What is claimed is:

1. A communication method applying to a communications system, wherein the communications system comprises a management node, a first computing node, and a second computing node, a first operating system (OS) runs on the first computing node and a second OS runs on the second computing node, the communication method comprising:

sending, by the first computing node, a communication manner parsing request to the management node, wherein the communication manner parsing request comprises an identifier of the first computing node and an identifier of the second computing node;

determining, by the management node, information about a physical communication manner between the first computing node and the second computing node according to the communication manner parsing request and communication manner reference information, wherein the communication manner reference information comprises system topology information and a system physical resource allocation result, wherein the information about the physical communication manner comprises information required for establishing a physical communication connection between the first computing node and the second computing node;

sending, by the management node, the information about the physical communication manner to the first computing node; and communicating, by the first computing node, with the second computing node based on the information about the physical communication manner.

2. The communication method according to claim 1, wherein before sending, by the first computing node, the communication manner parsing request to the management node, the communication method further comprises:

determining, by the first computing node, whether specified historical information comprises the information about the physical communication manner between the first computing node and the second computing node; and sending, by the first computing node, a communication manner parsing request to the management node comprises:

sending, by the first computing node, the communication manner parsing request to the management node when determining that the historical information does not comprise the information about the physical communication manner.

3. The communication method according to claim 1, further comprising:

recording, by the first computing node, the information about the physical communication manner into the historical information.

4. The communication method according to claim 1, wherein the information about the physical communication manner comprises one of:
information about a local memory sharing communication manner, information about an external memory sharing communication manner, or information about a high-speed interconnection communication manner.

5. The communication method according to claim 1, wherein the communication manner reference information further comprises a system physical resource usage status.

6. The communication method according to claim 1, wherein the communication manner parsing request further comprises a data packet type and a data packet size.

7. The communication method according to claim 1, wherein the system topology information comprises one or more of:
architecture information of a central processing unit CPU, local memory information, externally shared memory information, decoupling architecture high-speed interconnection information, or network interconnection information.

8. A communications system, comprising:
one or more processors;
a management node coupled to the one or more processors;
a first computing node coupled to the one or more processors;
a second computing node coupled to the one or more processors;
wherein a first operating system (OS) runs on the first computing node and a second OS runs on the second computing node;
wherein the first computing node is configured to send a communication manner parsing request to the management node, wherein the communication manner parsing request comprises an identifier of the first computing node and an identifier of the second computing node;
wherein the management node is configured to determine, by the one or more processors, information about a physical communication manner between the first computing node and the second computing node according to the communication manner parsing request and communication manner reference information, wherein the communication manner reference information comprises system topology information and a system physical resource allocation result, wherein the information about the physical communication manner comprises information required for establishing a physical communication connection between the first computing node and the second computing node;
wherein the management node is further configured to send the information about the physical communication manner to the first computing node; and
wherein the first computing node is further configured to communicate with the second computing node based on the information about the physical communication manner.

9. The communications system according to claim 8, wherein the first computing node is further configured to:
determine whether specified historical information comprises the information about the physical communication manner between the first computing node and the second computing node; and send the communication manner parsing request to the management node when determining that the historical information does not comprise the information about the physical communication manner.

10. The communications system according to claim 8, wherein the first computing node is further configured to record the information about the physical communication manner into the historical information.

11. The communications system according to claim 8, wherein the information about the physical communication manner comprises one of:
information about a local memory sharing communication manner, information about an external memory sharing communication manner, or information about a high-speed interconnection communication manner.

12. The communications system according to claim 8, wherein the communication manner reference information further comprises a system physical resource usage status.

13. The communications system according to claim 8, wherein the communication manner parsing request further comprises a data packet type and a data packet size.

14. The communications system according to claim 8, wherein the system topology information comprises one or more of:
architecture information of a central processing unit CPU, local memory information, externally shared memory information, decoupling architecture high-speed interconnection information, or network interconnection information.

15. A non-transitory machine-readable medium having instructions stored therein, which when executed by one or more processors, cause the one or more processors to perform operations, the operations comprising:
sending, by a first computing node, a communication manner parsing request to a management node, wherein the communication manner parsing request comprises an identifier of the first computing node and an identifier of a second computing node, wherein the communications system comprises the management node, the first computing node, and the second computing node, wherein a first operating system (OS) runs on the first computing node and a second OS runs on the second computing node;
determining, by the management node, information about a physical communication manner between the first computing node and the second computing node according to the communication manner parsing request and communication manner reference information, wherein the communication manner reference information comprises system topology information and a system physical resource allocation result, wherein the information about the physical communication manner comprises information required for establishing a physical communication connection between the first computing node and the second computing node;
sending, by the management node, the information about the physical communication manner to the first computing node; and
communicating, by the first computing node, with the second computing node based on the information about the physical communication manner.

16. The non-transitory machine-readable medium according to claim 15, wherein before sending, by the first computing node, the communication manner parsing request to the management node, the communication method further comprises:

determining, by the first computing node, whether specified historical information comprises the information about the physical communication manner between the first computing node and the second computing node; and sending, by the first computing node, a communication manner parsing request to the management node comprises:

sending, by the first computing node, the communication manner parsing request to the management node when determining that the historical information does not comprise the information about the physical communication manner.

17. The non-transitory machine-readable medium according to claim 15, further comprising:

recording, by the first computing node, the information about the physical communication manner into the historical information.

18. The non-transitory machine-readable medium according to claim 15, wherein the information about the physical communication manner comprises one of:

information about a local memory sharing communication manner, information about an external memory sharing communication manner, or information about a high-speed interconnection communication manner.

19. The non-transitory machine-readable medium according to claim 15, wherein the communication manner reference information further comprises a system physical resource usage status.

20. The non-transitory machine-readable medium according to claim 15, wherein the communication manner parsing request further comprises a data packet type and a data packet size.

* * * * *